(12) United States Patent
Vollenwyder et al.

(10) Patent No.: US 9,397,523 B2
(45) Date of Patent: Jul. 19, 2016

(54) SYSTEM AND METHOD FOR TRANSFERRING ELECTRIC ENERGY TO A VEHICLE USING CONSTANT CURRENT OPERATION OF SEGMENTS OF A CONDUCTOR ARRANGEMENT

(75) Inventors: Kurt Vollenwyder, Kingston (CA); Konrad Woronowicz, Kingston (CA); Robert Czainski, Szczecin (PL); Jürgen Meins, Braunschweig (DE)

(73) Assignee: Bombardier Transportation GmbH, Berlin (DE)

( * ) Notice: Subject to any disclaimer, the term of this patent is extended or adjusted under 35 U.S.C. 154(b) by 241 days.

(21) Appl. No.: 14/124,291

(22) PCT Filed: Jun. 11, 2012

(86) PCT No.: PCT/EP2012/061027
§ 371 (c)(1),
(2), (4) Date: Dec. 6, 2013

(87) PCT Pub. No.: WO2012/168477
PCT Pub. Date: Dec. 13, 2012

(65) Prior Publication Data
US 2014/0097675 A1    Apr. 10, 2014

(30) Foreign Application Priority Data

Jun. 10, 2011 (GB) .................................. 1109825.8

(51) Int. Cl.
*H02J 17/00* (2006.01)
*B60L 5/00* (2006.01)
(Continued)

(52) U.S. Cl.
CPC ................. *H02J 17/00* (2013.01); *B60L 5/005* (2013.01); *B60L 9/00* (2013.01); *B60M 3/04* (2013.01); *B60L 2200/18* (2013.01); *B60L 2200/26* (2013.01); *Y10T 29/49117* (2015.01)

(58) Field of Classification Search
CPC ......... B60L 5/005; B60L 11/182; B60L 9/00; B60L 2200/26; B60L 2200/18; H02J 5/005; H02J 7/025; H02J 17/00; Y02T 90/122; Y02T 90/121; B60M 3/04; Y10T 29/49117
USPC .......................................................... 191/10
See application file for complete search history.

(56) References Cited

U.S. PATENT DOCUMENTS

| 4,836,344 | A | * | 6/1989 | Bolger | .................... B60L 5/005 191/10 |
| 5,174,215 | A | * | 12/1992 | Barrows | ................ B60L 15/005 104/288 |

(Continued)

FOREIGN PATENT DOCUMENTS

| CA | 2403762 A1 | 9/2002 |
| CN | 1486886 A | 4/2004 |

(Continued)

OTHER PUBLICATIONS

Covic, G., et al. A Three-Phase Inductive Power Transfer System for Roadway-Powered Vehicles, IEE Transactions on Industrial Electronics, vol. 54, No. 6, pp. 3370-3378 (2007).

*Primary Examiner* — Mark Le
(74) *Attorney, Agent, or Firm* — The Webb Law Firm

(57) ABSTRACT

A system for transferring electric energy to a vehicle such as a track bound vehicle or road automobile. The system includes an electric conductor arrangement which produces an alternating electromagnetic field, transfers electromagnetic energy to the vehicle and includes a plurality of segments. Each segment extends along the vehicle path of travel and includes one line for each phase of alternating current carried by the segment. The system includes a current supply for conducting electric energy to the segments which are electrically connected in parallel. At least one segment is coupled to the current supply via a constant current source. Each constant current source includes one or more inductances and one or more capacitances, the inductances and capacitances being adapted to each other and the input side of the constant current source so that a constant current is output to the output side.

10 Claims, 10 Drawing Sheets

(51) Int. Cl.
*B60M 3/04* (2006.01)
*B60L 9/00* (2006.01)

(56) References Cited

U.S. PATENT DOCUMENTS

| | | | | |
|---|---|---|---|---|
| 5,207,304 | A * | 5/1993 | Lechner | B60L 9/00 |
| | | | | 191/10 |
| 5,821,728 | A | 10/1998 | Schwind | |
| 6,005,304 | A | 12/1999 | Seelig | |
| 6,089,362 | A | 7/2000 | Takasan et al. | |
| 8,459,188 | B2 * | 6/2013 | Miller | B60L 13/10 |
| | | | | 104/281 |
| 8,528,710 | B2 * | 9/2013 | Yamamoto | H02J 5/005 |
| | | | | 191/10 |
| 2005/0146830 | A1 | 7/2005 | Green et al. | |
| 2011/0315496 | A1 * | 12/2011 | Bohori | B60L 5/005 |
| | | | | 191/10 |
| 2014/0318913 | A1 * | 10/2014 | Woronowicz | B60L 5/005 |
| | | | | 191/10 |

FOREIGN PATENT DOCUMENTS

| | | |
|---|---|---|
| CN | 1659757 A | 8/2005 |
| DE | 4446779 A1 | 6/1996 |
| DE | 19856937 A1 | 6/2000 |
| EP | 0289868 A2 | 11/1988 |
| GB | 2461578 A | 7/2008 |
| GB | 2463692 A | 9/2008 |
| GB | 2474867 A | 10/2009 |
| GB | 2476497 A | 12/2009 |
| WO | 9323908 A1 | 11/1993 |
| WO | 9323909 A1 | 11/1993 |
| WO | 9908359 A1 | 2/1999 |
| WO | 9930402 A1 | 6/1999 |
| WO | 0171882 A1 | 9/2001 |
| WO | 2010000495 A1 | 1/2010 |
| WO | 2010031593 A2 | 3/2010 |
| WO | 2010031595 A2 | 3/2010 |
| WO | 2011046400 A2 | 4/2011 |
| WO | 2011145953 A1 | 11/2011 |

* cited by examiner

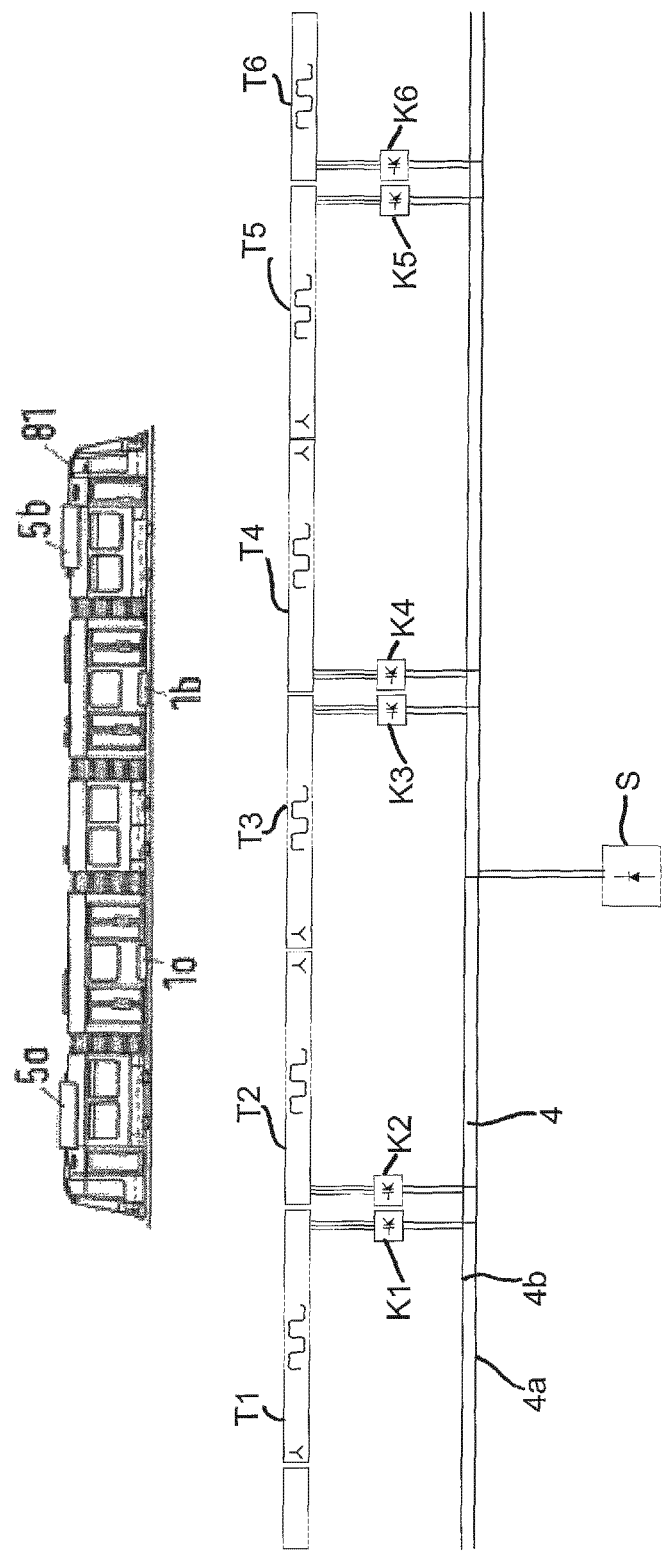

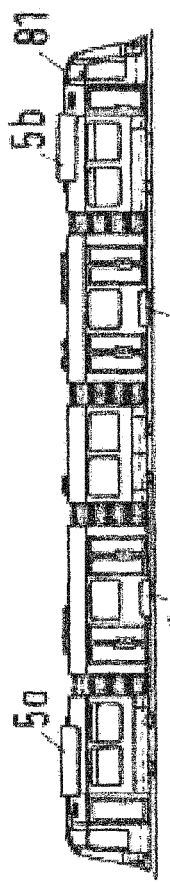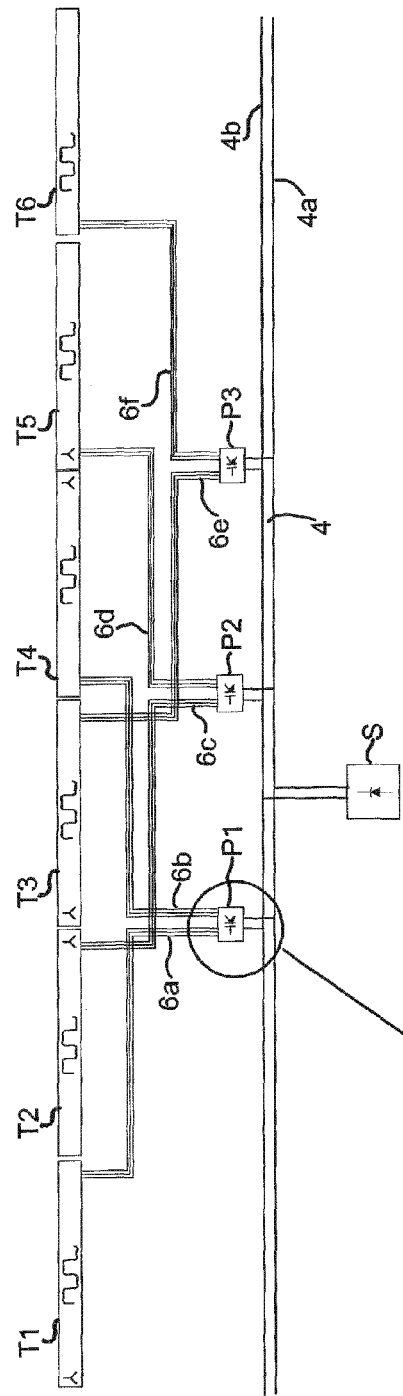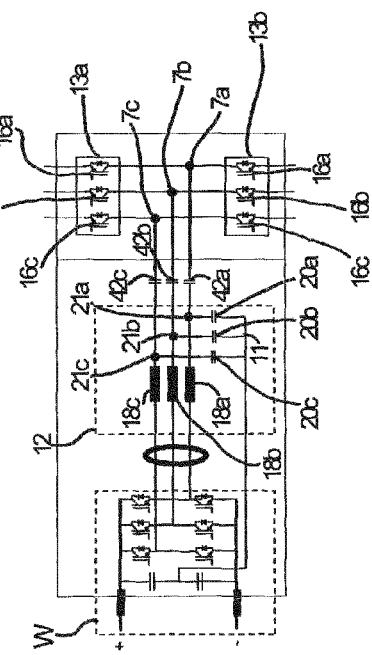

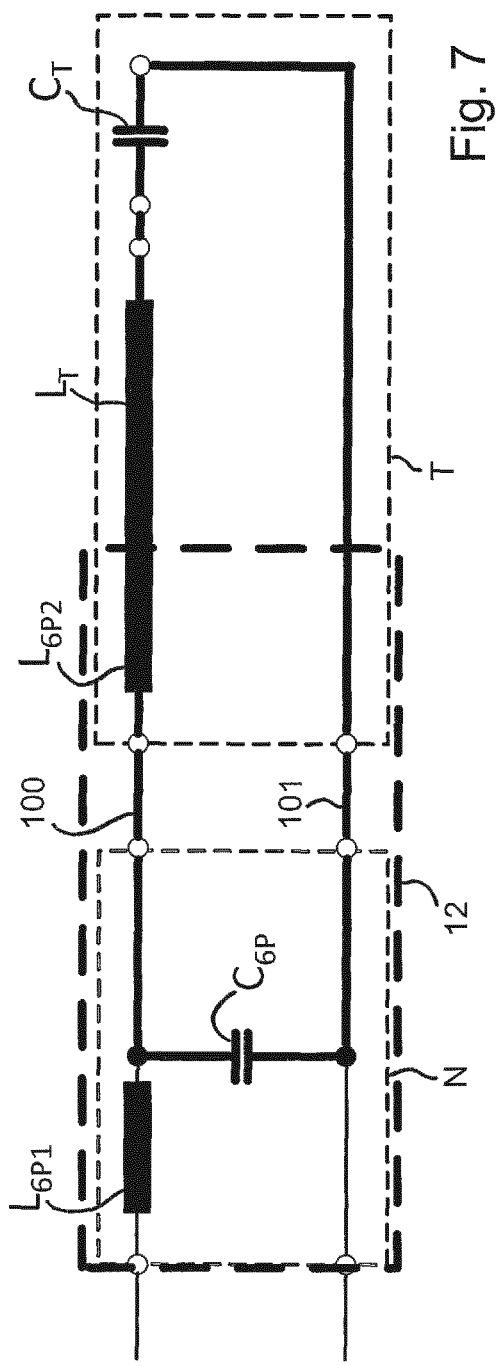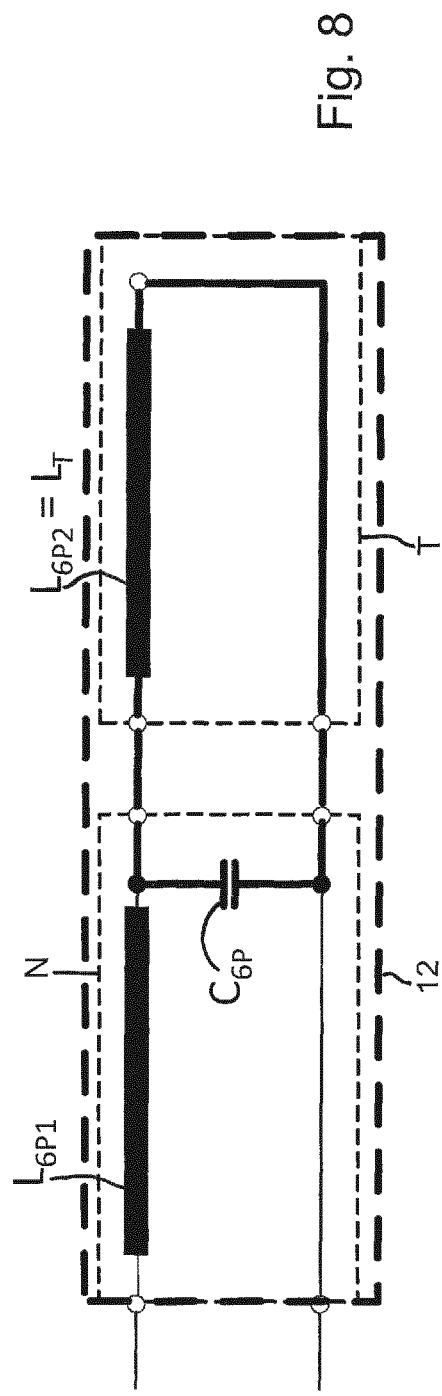

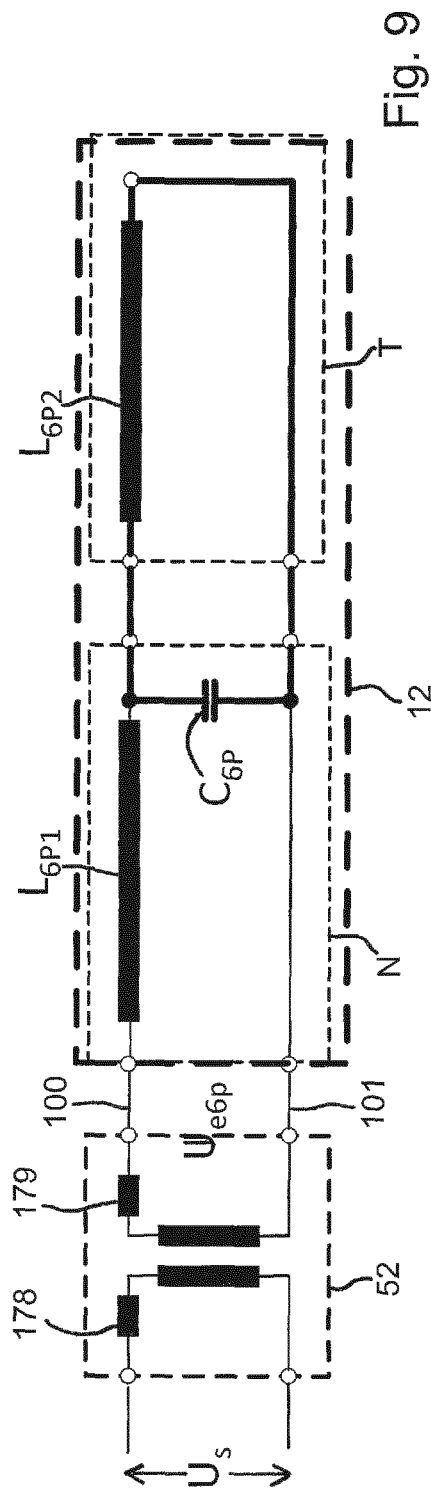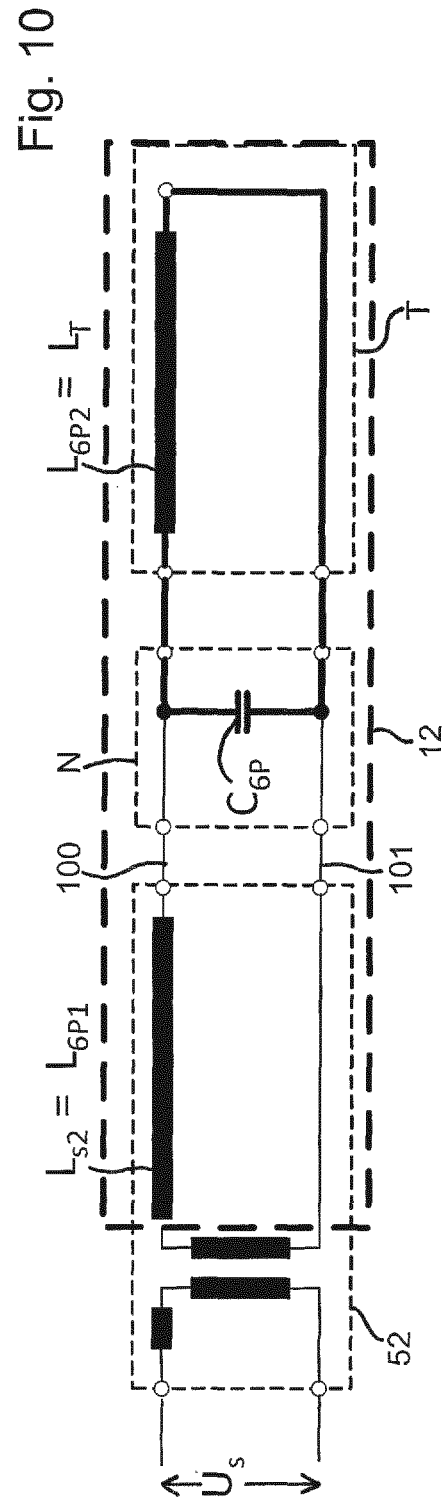

SYSTEM AND METHOD FOR TRANSFERRING ELECTRIC ENERGY TO A VEHICLE USING CONSTANT CURRENT OPERATION OF SEGMENTS OF A CONDUCTOR ARRANGEMENT

CROSS-REFERENCE TO RELATED APPLICATIONS

This application is the United States national phase of International Application No. PCT/EP2012/061027 filed Jun. 11, 2012, and claims priority to United Kingdom Patent Application No. 1109825.8 filed Jun. 10, 2011, the disclosures of which are hereby incorporated in their entirety by reference.

BACKGROUND OF THE INVENTION

1. Field of the Invention

The invention relates to the transfer of electric energy to a vehicle, in particular to a track bound vehicle such as a light rail vehicle (e.g. a tram) or to a road automobile such as a bus. A corresponding system comprises an electric conductor arrangement for producing an alternating electromagnetic field and for thereby transferring electromagnetic energy to the vehicle. The conductor arrangement comprises a plurality of segments, wherein each segment extends along a different section of the path of travel of the vehicle. At least one of the segments is coupled to a current supply via an associated constant current source adapted to keep the electric current through the segment constant independently of the electric power which is transferred to one or more vehicles traveling along the segment. The invention also relates to a corresponding method of manufacturing the system and to a corresponding method of operating the system.

2. Description of Related Art

Track bound vehicles, such as conventional rail vehicles, mono-rail vehicles, trolley busses and vehicles which are guided on a track by other means, such as other mechanical means, magnetic means, electronic means and/or optical means, require electric energy for propulsion on the track and for operating auxiliary systems, which do not produce traction of the vehicle. Such auxiliary systems are, for example, lighting systems, heating and/or air condition system, the air ventilation and passenger information systems. However, more particularly speaking, the present invention is related to a system for transferring electric energy to a vehicle which is not necessarily (but preferably) a track bound vehicle. A vehicle other than a track bound vehicle is a bus, for example. An application area of the invention is the transfer of energy to vehicles for public transport. Generally speaking, the vehicle may be, for example, a vehicle having an electrically operated propulsion motor. The vehicle may also be a vehicle having a hybrid propulsion system, e.g. a system which can be operated by electric energy or by other energy, such as electrochemically stored energy or fuel (e.g. natural gas, gasoline or petrol).

WO 2010/031593 A1 describes a system and a method for transferring electric energy to a vehicle, wherein the system comprises the features mentioned above. It is disclosed that the system comprises an electric conductor arrangement for producing an alternating electromagnetic field and for thereby transferring the energy to the vehicle. The electric conductor arrangement comprises at least two lines, wherein each line is adapted to carry a different one of phases of an alternating electric current. The conductor arrangement comprises a plurality of segments, wherein each segment extends along a different section of the path of travel of the vehicle. Each segment comprises sections of the at least two lines and each segment can be switched on and off separately of the other segments. Each one of successive segments of the conductor arrangement can be connected via a separate switch for switching on and off the element to a mainline. WO 2010/000495 A1 describes the field of invention and possible embodiments of the conductor arrangement in more detail. In particular, the serpentine-like embodiment of the conductor arrangement can also be chosen for the present invention.

Each segment may be connected to a direct current supply via an inverter for converting the direct current to an alternating current for producing the electromagnetic field. Alternatively, the segments may be connected to an alternating current supply. Combinations are possible, for example two segments may be connected to a direct current supply via a common inverter.

In any case, producing a constant alternating current in the line or lines of the segments has several advantages compared to the operation of the segment at constant voltage. One advantage is that the constant current may be a sinus function of time. This means that only a single frequency of electromagnetic waves is produced. Operating the segment at constant voltage in contrast produces non-sinusoidal functions, which means that harmonics at different frequencies are produced. Furthermore a constant current on the primary side (the side of the conductor arrangement along the track) enables to reduce the size of the receiver for receiving the electromagnetic field on the secondary side (the side of the vehicle).

The constant current source can be realized as a passive network of impedances, which means that none of the components of the constant current source is actively controlled as it would be in the case of a transistor in the line which is used for current limitation.

The constant current source can be located at the input side of an alternating current supply, i.e. a constant alternating current is fed to the segments via the current supply.

However, this does not allow for individual operation of the segments, if the segments are connected in parallel to each other with the current supply. Individual operation of the segments would result in currents through the segments of the varying size.

Therefore, it is preferred for segments, which are connected in parallel to each other with a current supply, to provide a constant current source for each segment which is to be operated individually. Such an individual operation has the advantage that the segment can be switched on while a vehicle is traveling along the segment and can be switched off otherwise.

In order to transfer sufficient power for providing vehicles (in particular trams or busses) for propulsion, currents of at least some tens of Amperes and voltages of at least some tens of Volts are required, i.e. the transferred power should be in the range of at least some kW. In case of a tram, for example, the voltage at the segment may be in the range of 500-1.000 V and the effective current through the segment may be in the range of 150-250 A.

Corresponding impedances, in particular inductances, require heavy components having corresponding large volumes. In addition, these components produce a significant part of the costs of manufacturing such a system.

SUMMARY OF THE INVENTION

It is an object of the present invention to provide a system for transferring electromagnetic energy from a track to a vehicle or to a plurality of vehicles, which comprises at least one segment of an electric conductor arrangement which is connected to a current supply via a constant current source, wherein the efficiency of operating the segment is high and wherein the effort for manufacturing and installing the system is reduced. It is a further object of the invention to provide a corresponding method of manufacturing the system and a corresponding method of operating the system.

The system of the present invention comprises a current supply for conducting electric energy to a plurality of the segments. The segments are electrically connected in parallel to each other with the current supply, i.e. each of the segments which is fed by the current supply is operated using the same voltage. A common current supply for a plurality of segments does not exclude the existence of further segments which are connected to a separate, second current supply. Furthermore, not all segments which are fed by the current supply must be segments for providing vehicles on the same track with energy. Rather, a railway or a road may comprise, for example, two tracks extending in parallel to each other and each of the tracks may be provided with consecutive segments. At least some of the segments of different tracks may be fed by a common current supply.

For example, each of the plurality of segments may be coupled to the current supply via an associated switching unit adapted to switch on and off the segment by connecting or disconnecting the segment to/from the supply. Each switching unit may comprise a number of switches which corresponds to the number of lines of the associated segment, wherein the lines are adapted to carry a different phase of an alternating current. Preferably, the switches of the switching unit are synchronously switched on and off, for example by using a common control device for controlling the operation of the switches.

Each segment may be coupled to current supply via a constant current source adapted to keep the electric current through the segment constant—while the segment is switched on—independently of the electric power which is transferred to one or more vehicles travelling along the segment. The term "coupled" includes a direct electric connection and alternatively includes inductive coupling, for example using a transformer. According to the attached claims, at least one of the segments is coupled to the current supply via a constant current source.

Each constant current source comprises a first inductance, and optionally more than one inductance, and comprises a first capacitance, and optionally more than one capacitance. The inductance(s) and the capacitance(s) are adapted to each other and to the voltage at the input side of the constant current source so that a desired constant current is output to the output side, i.e. the side of the segment. Therefore, the input side of the constant current source is the side of the current supply. The first inductance is arranged in a line of the constant current source which connects the input side with the output side and at least one junction of the line is connected with the first capacitance.

In other words, at least the first inductance and the first capacitance, and optionally further impedances of the constant current source and possibly further components of the constant current source (e.g. at least one resistor), form a passive network which keeps the alternating current through the segment constant.

Preferably, the inductance(s) and the capacitance(s) are adapted to the frequency of the alternating current at the input side of the constant current source so that the alternating current through the segment oscillates at a resonance frequency, which is the resonance frequency of the combination of the segment with the constant current source.

In case that the segment comprises a plurality of lines, wherein each line is adapted and connected to carry a different phase of the alternating current, the constant current source comprises a corresponding number of lines which are connected, in each case, to the corresponding line of the segment, so that a series connection of the line of the constant current source and the corresponding line of the segment is performed. In case of a plurality of lines, each line of the constant current source comprises a first inductance and a first impedance is connected to the line via a junction. In particular, the junctions of different lines of the constant current source may be connected to a common star point via the corresponding first capacitance. In any case, there may be two junctions per line, a first capacitance may be connected to a first junction of the line and a second capacitance may be connected to a second junction of the line. If the first inductance is arranged between the first and second junction, the network can be called a Π-network. If there is just one junction per line and if there is at least one inductance within the line at both sides of the junction, the network can be called a T-network. In the preferred embodiment, a T-network is used according to the present invention.

Any segment which is adapted to produce an electromagnetic field in order to transfer energy to a vehicle comprises an inherent inductance. According to a basic idea of the present invention, the inherent inductance is used to keep the reactive power small. Therefore, it is proposed that the first inductance and the first capacitance as well as a second inductance, which is formed at least partly (preferably completely) by the inherent inductance of the segment, are adapted to each other and to any additional capacitance in the segment so that the segment can be operated at a corresponding resonance frequency and the reactive power produced by the segment is essentially zero. Preferably, the second inductance is completely formed by the inherent inductance of the segment or of the line of the segment. Furthermore, it is preferred that the segment does not comprise an additional capacitance which compensates the inherent inductance(s) of the segment in order avoid a production of reactive power by the segment. In other words, the real power, sometimes called "active power", is as high as possible.

Since the inherent inductance of the segment is used to optimize the efficiency of energy transfer, the number of discrete components can be reduced: First, compared to a T-network having inductances of the same size at both sides of the junction, the inductance at the output side of the constant current source can be reduced or omitted. Second, additional capacitances for compensating the inherent inductance of the segment in order to reduce or eliminate the reactive power can be omitted or can be reduced to a smaller size. As a result, installation effort and costs are reduced. Furthermore, the effort for cooling the inductance at the output side of the constant current source is reduced, since there is only a small discrete component (for example a small inductor) or there is no discrete component at the output side of the constant current source, and the inductance of the segment is an inherent property and is therefore distributed over the whole segment.

In particular, the following is proposed: A system for transferring electric energy to a vehicle, in particular to a track bound vehicle such as a light rail vehicle or to a road automobile such as a bus, wherein the system comprises an electric conductor arrangement for producing an alternating electromagnetic field and for thereby transferring electromagnetic energy to the vehicle, the conductor arrangement comprises a plurality of segments, wherein each segment extends along a section of the path of travel of the vehicle, each segment comprises one line for each phase of an alternating current which is to be carried by the segment in order to produce the electromagnetic field, the system comprises a current supply for conducting electric energy to the plurality of the segments, wherein the segments are electrically connected in parallel to each other with the current supply, at least one of the segments is coupled to the current supply via an associated constant current source adapted to keep the electric current through the segment constant—while the segment is operated—independently of the electric power which is transferred to one or more vehicles traveling along the segment, each constant current source comprises a first inductance and optionally more than one inductances and comprises a first capacitance and optionally more than one capacitances, the inductances and the capacitances being adapted to each other and to the voltage at the input side of the constant current source so that a desired constant current is output to the output side, i.e. the side of the segment, the first inductance is arranged in a line of the constant current source which connects the input side with the output side and at least one junction of the line is connected with the first capacitance, the first inductance and the first capacitance as well as a second inductance, which is formed at least partly by the inherent inductance of the segment, are adapted to each other and to any additional capacitance in the segment so that the segment can be operated at a corresponding resonance frequency and the reactive power produced by the segment is essentially zero.

Furthermore, a method is proposed of manufacturing a system for transferring electric energy to a vehicle, in particular the system of one of the preceding claims, including the steps:

providing an electric conductor arrangement for producing an alternating electromagnetic field and for thereby transferring electromagnetic energy to the vehicle, providing a plurality of segments as part of the conductor arrangement, so that each segment extends along a section of the path of travel of the vehicle, wherein each segment comprises one line for each phase of an alternating current which is to be carried by the segment in order to produce the electromagnetic field, providing a current supply for conducting electric energy to a plurality of the segments, wherein the segments are electrically connected in parallel to each other with the current supply, coupling at least one of the segments to the current supply via an associated constant current source, which is adapted to keep the electric current through the segment constant—while the segment is operated—independently of the electric power which is transferred to one or more vehicles traveling along the segment, equipping each constant current source with a first inductance and optionally more than one inductances and with a first capacitance and optionally more than one capacitances, wherein the inductances and capacitances are adapted to each other and to the voltage at the input side of the constant current source so that a desired constant current is output to the output side, i.e. the side of the segment, placing the first inductance in a line of the constant current source which connects the input side with the output side and connecting at least one junction of the line to the first capacitance, dimensioning the first inductance of the constant current source and the first capacitance as well as a second inductance, which is formed at least partly by the inherent inductance of the segment, so that the segment can be operated at a corresponding resonance frequency and the reactive power produced by the segment is essentially zero.

In addition, a method is proposed of operating a system for transferring electric energy to a vehicle, in particular the system of one of the preceding claims, including the steps:

producing an alternating electromagnetic field and thereby transferring electromagnetic energy to the vehicle by using an electric conductor arrangement, using a plurality of segments as parts of the conductor arrangement, wherein each segment extends along a different section of the path of travel of the vehicle, wherein one line or a plurality of lines of each segment is/are used to carry a respective phase or respective phases of an alternating current which produces the electromagnetic field, conducting electric energy to a plurality of the segments by using a current supply, wherein the segments are electrically connected in parallel to each other with the current supply, keeping the electric current through at least one of the segments constant—while the segment is operated—independently of the electric power which is transferred to one or more vehicles traveling along the segment, by using a constant current source, which is coupled to the segment on one side and to the current supply on the other side, using in each constant current source a first inductance and optionally more than one inductances and a first capacitance and optionally more than one capacitances, wherein the inductances and capacitances are adapted to each other and to the voltage at the input side of the constant current source so that a desired constant current is output to the output side, i.e. the side of the segment, wherein the first inductance is placed in a line of the constant current source which connects the input side with the output side and wherein at least one junction of the line is connected to the first capacitance, operating the segment so that the reactive power produced by the segment is essentially zero, by using the first inductance and the first capacitance as well as a second inductance, which is formed at least partly by the inherent inductance of the segment, which are dimensioned in a corresponding manner.

In particular, the segment is operated at the resonance frequency of the combination which is constituted by the segment, the first inductance, the first capacitance, the second inductance and further optional components.

Preferably, each of the plurality the segments is coupled to the current supply via an associated constant current source which is adapted as described above or below.

The segments may comprise a plurality of lines, wherein each line is adapted to carry a different phase of a multi-phase alternating current, wherein each line of the plurality of the segments is coupled to a corresponding line of the constant current source. Preferably, the segments and thereby the electric conductor arrangement comprise three lines. However, it is also possible, that there are only two or more than three-phases carried by a corresponding number of lines. In particular, each of the segments may comprise sections of each of the lines, so that each segment produces an electromagnetic field which is caused by the three phases.

The first inductance and the first capacitance are preferably parts of a common module which is electrically connected to the segment. In case of a plurality of lines, the common module preferably comprises the first inductances and the first capacitances of all lines of the constant current source. Integrating a plurality of components in a common module facilitates the mounting of the system on site. In particular, the common module may be buried in the ground. Furthermore, not only the effort for placing the units is reduced, but also the effort for establishing the electric connections between the components and to the external units (the current supply on one side and the segment on the other side). The common module may also comprise auxiliary equipment, such as a cooling fan or a liquid cooling arrangement. Furthermore, an inverter in case of a direct current supply and a control device for the switching unit mentioned above or for the inverter can be integrated in the common module.

For example, the common module may comprise a housing and/or a rack, wherein the components and units are arranged within the interior of the housing and/or fixed to the rack.

In particular, the common module may comprise a first and a second connection for connecting different sections of the current supply to the common module. This means that the common module itself comprises a further section of the current supply. This further section electrically connects the first and second connections for connecting the external sections of the current supply.

According to a preferred embodiment, the constant current source is connected to the current supply via a transformer and wherein the transformer is adapted to produce an input voltage to be input to the constant current source so that the desired constant current is produced by the constant current source. The transformer can also be used according to one of the embodiments described in this description, if the inherent inductance of the segment is not used for minimizing the reactive power. In other words, using the transformer can be a separate idea or can be combined with the invention described above.

It is preferred that the second inductance is completely formed by the inherent inductance of the segment or of the line of the segment, i.e. the transformer is adapted to the second inductance so that an input voltage is produced which results in the desired constant current.

A transformer increases flexibility, since it allows adapting the input voltage of the constant current source to the needs. In particular, a desired constant current through the segment can be set by choosing the transformation ratio of the transformer. Furthermore, transformers having different transformation ratios of the input voltage and the output voltage can be used to couple segments of different types (in particular having different line lengths and therefore different inductances) to the same current supply.

BRIEF DESCRIPTION OF THE DRAWINGS

Embodiments and examples of the invention will be described with reference to the attached figures. The figures show.

DESCRIPTION OF THE INVENTION

Figure 1:
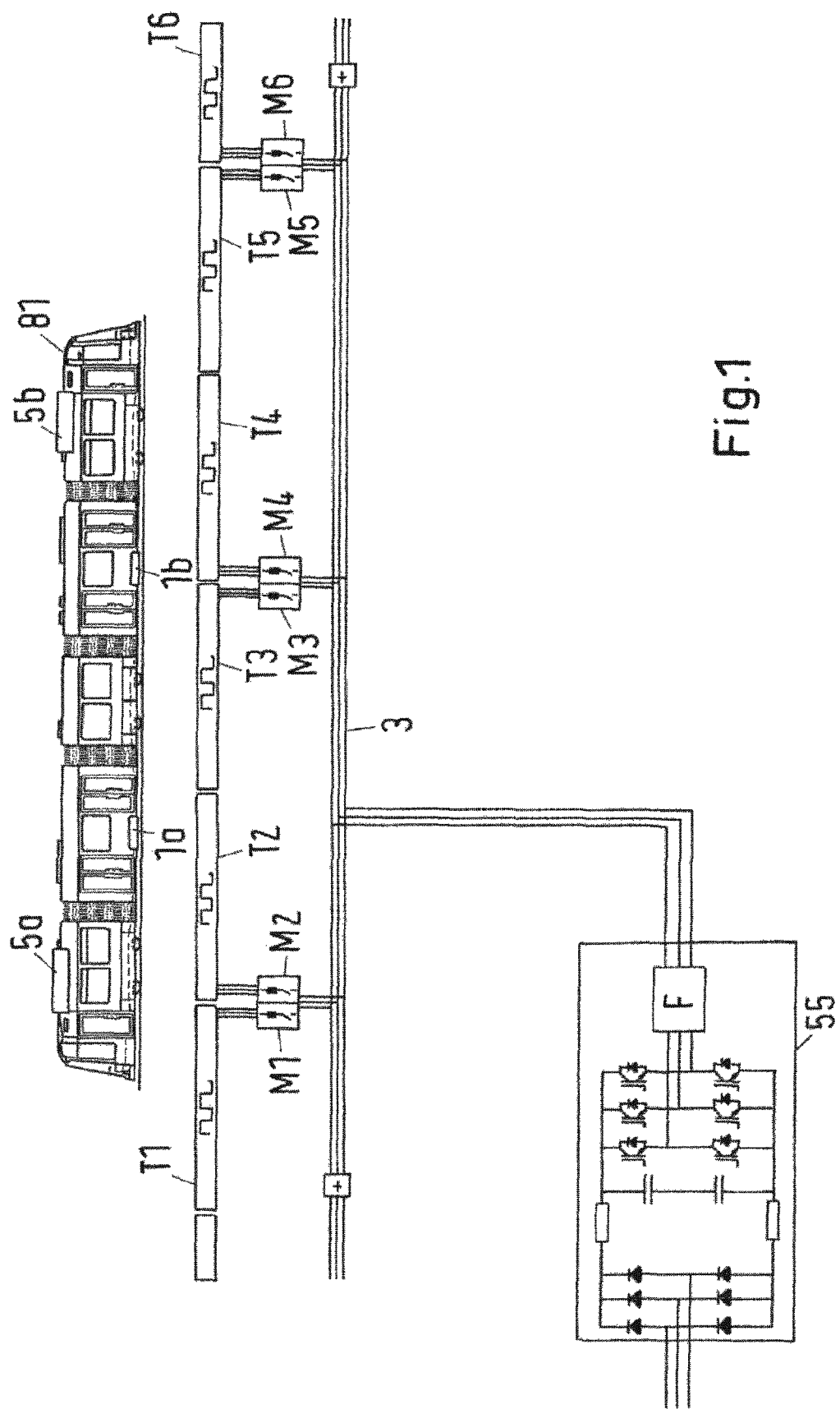
FIG. 1 an arrangement comprising a track for a rail vehicle and the vehicle, wherein the track is equipped with a plurality of segments for producing electromagnetic fields and wherein the segments are connected to an alternating current supply via modules comprising a switching unit and a constant current source, FIG. 2 an arrangement similar to the arrangement shown in FIG. 1, wherein the segments are connected in parallel to each other with a direct current supply, FIG. 3 an arrangement comprising a plurality of segments, wherein pairs of segments are connected to the same inverter for inverting a direct current, FIG. 4 a module comprising an inverter, a constant current source and an arrangement of two switching units for connecting the pairs of segments to the constant current source, FIG. 5 a circuit diagram of a constant current source, including an inductivity for minimizing the reactive power, wherein the circuit diagram shows the simplified version for a one-phase current, FIG. 6 a circuit diagram showing the combination of the constant current source, of FIG. 5 with a segment, FIG. 7 a circuit diagram for an arrangement similar to the arrangement shown in FIG. 6, wherein a part of the inherent inductance of the segment is used for minimizing the reactive power, FIG. 8 a circuit diagram of an arrangement similar to the arrangement shown in FIG. 7, wherein the whole inherent inductance of the segment is used for minimizing the reactive power, FIG. 9 a circuit diagram showing the arrangement of FIG. 8 which is connected to a transformer, FIG. 10 a circuit diagram of an arrangement similar to the arrangement shown in FIG. 9, wherein the inductance of the constant current source is combined with the stray inductance of the transformer in order to reduce the number of discrete components, FIG. 11 a circuit diagram of an arrangement similar to the arrangement shown in FIG. 10, wherein only part of the inherent inductance of the segment is used for minimizing the reactive power, FIG. 12 an embodiment of a module comprising a switching unit and a constant current source, in particular one of the modules of FIG. 1, FIG. 13 a further embodiment of a module comprising a switching unit and a constant current source, wherein the module also comprises a control device for controlling the operation of switches and comprises a current sensor for measuring the current through at least one of the lines which are to be connected to the lines of the associated segment, FIG. 14 another embodiment of a module, additionally comprising capacitances for compensating inductances of the lines of the associated segment, FIG. 15 a further modification of the module comprising a transformer for transforming the alternating voltage on the side of the alternating current supply to an alternating voltage of the side of the segment, wherein the stray inductance on the secondary side of the transformer serves as the input-side inductance (i.e. the first inductance) of the constant current source, and FIG. 16 a modification of the module of FIG. 4 adapted to provide a pair of segments with constant current, wherein the respective constant current sources of the segments use common first inductances and wherein switches are used to either operate the first segment, the second segment or none of the segments.

FIG. 1 schematically shows a vehicle 81, in particular a light rail vehicle such as a tram, travelling along a track. In this specific embodiment, the vehicle 81 comprises two receivers 1a, 1b for receiving electromagnetic fields which are produced by segments T1, . . . , T6 of the track. The receivers 1a, 1b are located at the bottom of the vehicle 81, in a middle section of the front part and back part of the vehicle 81. The receivers may comprise a plurality of lines for producing different phases of an alternating current. A vehicle may have any other number of receivers.

The receivers 1a, 1b are connected with other equipment within the vehicle 81, such as with a converter (not shown) for converting an alternating current produced by the receivers 1 to a direct current. For example, the direct current can be used to charge batteries or other energy storages 5a, 5b of the vehicle 81. Furthermore, the direct current can be inverted into an alternating current used to feed at least one traction motor of the vehicle 81 with electric energy.

The receivers 1a, 1b may be connected with a control device for controlling the operation of signal transmitters (not shown) which are also located at the bottom of the vehicle 81, so that signals emitted by the signal transmitters are emitted towards the track.

As mentioned, the track comprises a series of consecutive segments T1, T2, T3, T4, T5, T6 (in practice, further segments can be provided) which can be operated (i.e. energized) separately of each other and which produce during operation an electromagnetic field in order to transfer energy to the vehicle 81. Each segment extends across a section of the path of travel of the vehicle.

In the situation shown in FIG. 1, the receivers 1a, 1b of the vehicle 81 are located above segments T2, T4, respectively. Therefore, these segments T2, T4 are operated (i.e. are in the on-state, a current is flowing through the segment which causes the electromagnetic field) and the other segments T1, T3, T5, T6 are not operated (i.e. are in the off-state, there is no current through the segment).

In the example shown in FIG. 1 each segment T is connected to an alternating current supply line 3 via a module M1, M2, M3, M4, M5, M6. The module M comprises a switching unit adapted to switch on and off the segment by connecting or disconnecting the segment T to/from the supply 3. Since each segment of the example shown in FIG. 1 comprises three lines for carrying a different phase of an alternating current, each switching unit comprises three switches, at least one switch per line.

Furthermore, the modules M comprise the constant current source. The alternating current supply 3 is fed with an alternating current by an inverter 55.

In all figures, same reference signs denote elements and devices having the same or similar function.

In contrast to the arrangement shown in FIG. 1, the arrangement of FIG. 2 comprises a direct current supply 4 having a first line 4a at a first electric potential and a second supply line 4b at another electric potential. An energy source S is connected to the lines 4a, 4b. Each segment comprises a plurality of lines (in particular three lines) for carrying a separate phase of an alternating current. The alternating current is generated by an associated inverter K1, K2, K3, K4, K5, K6, which is connected to the direct current supply 4 at its direct current side. In the arrangement shown in FIG. 2 there is one inverter K per segment T.

FIG. 1 and FIG. 2 illustrate the different principles of supplying electric energy to the segments. According to the principle of FIG. 1, the multi-phase alternating current is generated at a central location and is supplied to the segments via an alternating current supply. According to the principle of FIG. 2, the current supply is a direct current supply connecting a central energy source with individual inverters. However, these principles can be combined.

FIG. 3 shows one example of such a combination. There are other ways of combining the principles and the present invention can be applied to theses other combinations as well. In the arrangement shown in FIG. 3, a plurality of inverters is connected in parallel to each other with a direct current supply 4 having lines 4a, 4b. However, in contrast to the arrangement shown in FIG. 2, the inverters P1, P2, P3 are connected to a plurality of alternating current supplies and each of these supplies connects the inverter P with one segment T. According to the specific embodiment shown in FIG. 3, each inverter P is connected to two segments T1, T4; T2, T5; T3, T6. As schematically indicated by the length of the vehicle 81 traveling along the segments T, only one segment T1, T2, T3 or T4, T5, T6 of the pairs of segments T is operated while the vehicle is traveling in the position shown in FIG. 3. Segments T2, T3, T4 are operated in order to transfer energy to the receivers 1a, 1b of vehicle 81. Operation of segments T1, T5, T6 would not result in a significant energy transfer to the vehicle 81. If the vehicle continues traveling from left to right in FIG. 3, segment T2 will be switched off and segment T5 will be switched on instead.

As a result, only one of the segments of a pair of segments T which is connected to the same inverter P will be operated at a time. Therefore, it is possible to combine the inverter with a constant current source which is adapted to produce a desired constant current through a single segment. In alternative arrangements, it would be possible, for example, to connect more than two segments to the same inverter and to operate only one of these segments at a time.

FIG. 4 shows a module comprising an inverter W which may be constructed as known to a skilled person. For example, in case of a three-phase alternating current to be produced, there may be bridges comprising a series connection of two semiconductor switches for each phase. Since the construction of inverters is known, the details are not described with reference to FIG. 4. On the alternating current side, the inverter W is connected to a constant current source 12. This constant current source 12 consists of a network of passive elements, namely one inductance 18a, 18b, 18c in each phase line of the alternating current and one capacitance 20a, 20b, 20c in a connection which connects one of the phase lines starting at a junction 21a, 21b, 21c to a common star point 11.

As will be described below, the constant current source may also comprise a second inductance in each phase line which is located at the opposite side of the junction 21 as the first inductance 18. Such an arrangement can be called a three-phase T-network. The purpose of the second inductance is to minimize the reactive power produced by the segment which is connected to the constant current source.

In the example shown in FIG. 4, the phase lines of the constant current source 12 are connected to junctions 7a, 7b, 7c via a second capacitance 42a, 42b, 42c. The capacitances 42 serve to compensate the inherent inductances of the segments which can be connected to the junctions 7. "Compensation" in this case means the reactive power produced by the respective segment is minimized while the segment is operated. This illustrates the principle that the compensating capacitance can be integrated in the module which also comprises the constant current source. Modifications of the module shown in FIG. 4 are possible. For example, the module may not comprise the inverter, since the inverter may be located at a central location and a plurality of the modules can be connected in parallel to each other with an alternating current supply, for example as shown in FIG. 1. Furthermore, the switching units 13a, 13b which are shown on the right hand side of FIG. 4 can be omitted or a single switching unit can be combined with the constant current source. In this case, it is preferred that the switching unit is located at the input side of the constant current source, i.e. switching off the switching unit means that the constant current source is disconnected from the current supply.

In the example shown in FIG. 4, a first switching unit 13a comprising semiconductor switches 16a, 16b, 16c, one in each phase line, is connected to the junctions 7a, 7b, 7c and in a similar manner the semiconductor switches 16a, 16b, 16c of a second switching unit 13b are also connected to the junctions 7. For example, the first switching unit 13a may be connected to the alternating current supply 6a, 6c or 6e of FIG. 3 and the second switching unit 13b may be connected to the alternating current supply 6b, 6d or 6f of FIG. 3.

Figure 5:
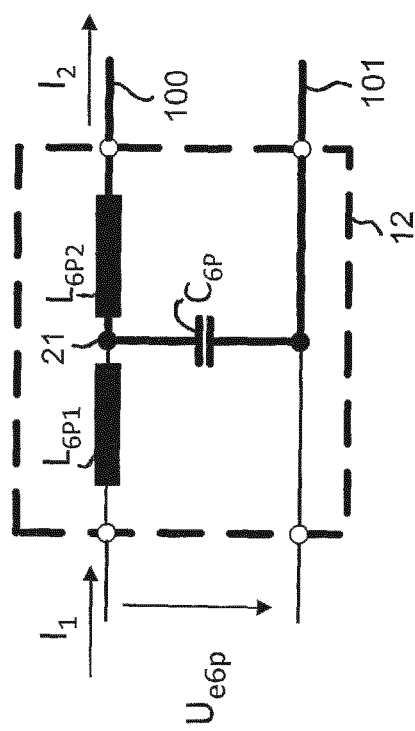

The T-network shown in FIG. 5 comprises a first inductance $L_{6P1}$ and a second inductance $L_{6P2}$. The index "6P" indicates that the constant current source may be a six-pole filter, i.e. a network of passive components having three phase lines and therefore having three poles or connections at the input side and three poles or connections at the output side of the constant current source. However, the invention is not restricted to three phases. Rather, the invention can be applied to constant current operation of segments having just one phase line, i.e. the segments are operated using a single-phase alternating current. Furthermore, the invention can be applied to any other number of phases.

The illustrations shown in FIG. 5-FIG. 11 refer the case of a single-phase constant current source. FIG. 12-15 will show corresponding examples for the case of three phases.

Within the phase line 100 in between the first and second inductance $L_{6P1}$, $L_{6P2}$, a junction 21 is arranged to which a capacitance $C_{6P}$ is connected. The opposite pole of the capacitance is connected to the other line 101 which does not comprise the first and second inductance or (in case of a plural-phase arrangement) is connected to a star point.

The input side of the constant current source 12 is shown on the left in FIG. 5. The voltage at the input side is denoted by $U_{e6p}$ and the current at the input side is denoted by $I_1$. The current at the output side is denoted by $I_2$.

Figure 6:
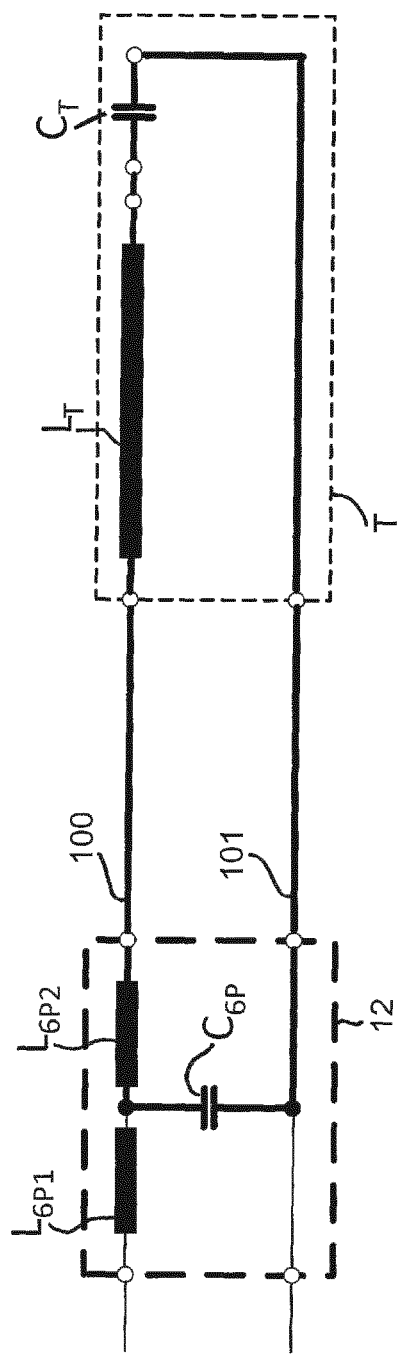

FIG. 6 shows the constant current source 12 of FIG. 5 connected to a segment T which has an inherent inductance $L_T$. As a result, it is typically necessary to compensate the inherent inductance $L_T$ by an additional capacitance $C_T$ connected in series to the inherent inductance $L_T$, in order to operate the segment at a desired resonance frequency and in order to reduce or minimize the reactive power which would be produced or is produced while the segment T is operated.

According to the present invention, it is proposed to use at least a part of the inherent inductance of the segment T as part of the T-network of the constant current source. I.e. this part or the whole inherent inductance $L_T$ is used to reduce or eliminate the reactive power produced by the segment T.

FIG. 7 shows the case in which only a part of the inherent inductance $L_T$ is used. The dashed line in closing the elements of the T-network cuts the inherent inductance $L_T$ in two parts. As a result, there is still one part of the inherent inductance $L_T$ to be compensated by an additional capacitance $C_T$. However, the dimension of this compensating capacitance is smaller compared to the case shown in FIG. 6.

FIG. 8 shows the case that the whole inherent inductance $L_T$ is used as part of the T-network. However, the inherent inductance $L_T$ is typically larger than the inductance which is needed to produce a constant current of desired size (the first inductance $L_{6P1}$) with a given input voltage. On the other hand, the first and second inductance of the T-network should have the same dimension, i.e. should have the same value. Therefore, the inductances shown in FIG. 8 are longer (which corresponds to larger values) compared to FIG. 5, FIG. 6 and FIG. 7.

In resonance, the inductance(s) and the capacitance(s) of the constant current source are adapted to the frequency of the alternating current at the input side of the constant current source so that the alternating current through the segment oscillates at a resonance frequency, which is the resonance frequency of the combination of the segment with the constant current source, the following applies to an LC-circuit, i.e. a circuit comprising an inductance L and a capacitance C:

$$j\omega L = -1/(j\omega C) \qquad (1)$$

wherein $j\omega$ denotes the complex angular frequency. With reference to FIG. 5, equation (1) can be written:

$$j\omega L_{6P1} = j\omega L_{6P2} = j\omega L_{6P} = -1/(j\omega C) \qquad (2)$$

wherein $L_{6P}$ denotes the value of the first and second inductance. The current $I_2$ at the output side of the constant current source is:

$$I_2 = U_{e6p}/(j\omega L_{6P}) \qquad (3)$$

Which means that a desired constant current of this size can be achieved by dimensioning the input voltage $U_{e6p}$ and the inductance $L_{6P}$ correspondingly. In other words, with reference to FIG. 8, the input voltage needs to be adapted in order to achieve the desired constant current at the output side of the constant current source.

Therefore, it is preferred to use a transformer 52 at the input side of the constant current source as shown in FIG. 9. The equivalent circuit diagram shown in FIG. 9 comprises, within the transformer 52, a first stray inductance 178 at the primary side (input side) of the transformer and a second stray inductance 179 at the output side (secondary side) of the transformer. The voltage at the input side of the transformer is denoted by $U_S$. The transformation ratio of the transformer 52 (i.e. the ratio of the input voltage $U_S$ to the transformer output voltage $U_{e6p}$) is chosen so that the desired input voltage of the constant current source is achieved.

Figure 11:
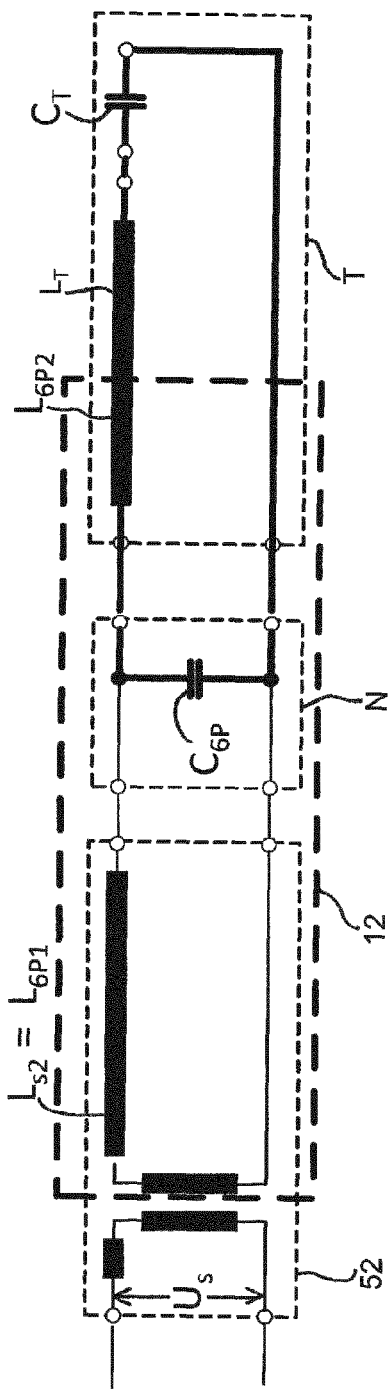

As shown in FIG. 10, the number of discrete components can further be reduced if the first inductance $L_{6P1}$ of the constant current source is realized by the same discrete component as any inductance on the secondary side (output side, on the right hand side of transformer 52 in FIG. 10) of the transformer 52. In particular, the windings on the output side of transformer 52 can be dimensioned so that they have the inductance value which is equal to the inductance value of the second inductance of the constant current source. This means that there is not additional discrete component, but only the windings on the secondary side of the transformer. Therefore, $$L_{s2} = L_{6P} \qquad (4)$$

wherein $L_s$ denotes the value of the stray inductance of the secondary side of the transformer 52. The circuit diagram of FIG. 9 and FIG. 10 and FIG. 11 is understood to be an equivalent circuit diagram. In particular, the small inductances 178 on the primary side of the transformer 52 and 179 on the secondary side of the transformer 52 are the inductances of the windings on the primary or secondary side, respectively.

FIG. 11 shows a variant of FIG. 10, wherein an additional capacitance $C_T$ is used to compensate a part of the inherent inductance of the segment T.

The transformer can also be used if the whole inherent inductance of the segment is to be compensated or is not compensated, i.e. if no part of the inherent inductance is used for reducing or minimizing the reactive power.

Figure 12:
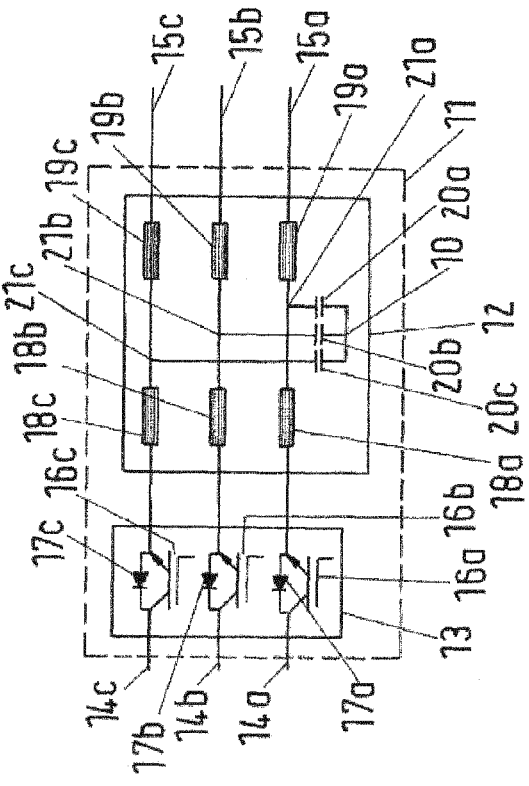

FIG. 12 shows a module 11 comprising a constant current source 12 and a switching unit 13. Similarly to FIG. 4, there are lines for three phases of a three-phase alternating current. Each line has a first contact 14a, 14b, 14c for connecting the line with the alternating current supply (for example the alternating current supply 3 of FIG. 1). Furthermore, each line has a second contact 15a, 15b, 15c for connecting the line with the three alternating current lines of the associated segment, for example segment T1 or T2 of FIG. 1. The module 11 may be used as one of modules M in FIG. 1. However, the second inductance 19 (see below and in FIG. 12) can partly or fully omitted if the inherent inductance of the segment is used for minimizing the reactive power. Furthermore, the switching unit can omitted or can be replaced by an inverter or transformer.

Following the current path of any of the three lines of module 11, the following components are arranged between the first contact 14 and the second contact 15. Within the switching unit 13, a solid state switch, in particular an IGBT 16, and a free-wheeling diode 17 are connected in parallel to each other. A corresponding control device for controlling the operation of the switches 16 is not shown in FIG. 12. Following the current path from the switching unit 13 towards the second contact 15, the line is connected to and comprises an inductance 18, followed by a junction 21 and a second inductance 19. The junctions 21 of each line are connected to a common star point 11 via a capacitance 20.

In particular, the first inductances 18 and the capacitances 20 form a constant current source, i.e. while operated the associated segment is provided with a constant alternating current which is independent of the load. The second inductance 19 is optional, but preferred, in order to avoid the generation of reactive power during operation of the segment. In particular, the first and second inductances are dimensioned to be equal.

More generally speaking, the constant current source 12 shown in FIG. 12 is a passive network, which means that none of the components of the constant current source 12 is actively controlled as it would be in the case of a transistor in the line which is used for current limitation. Due to the two inductances, the junction and the capacitance for each line, the network shown in FIG. 12 can be referred to as a T-network. Other passive networks could alternatively be used, provided that at least part of the inherent inductance of the segment is used for minimizing the reactive power.

As mentioned above, the combination of a switching unit and a constant current source shown in FIG. 12 comprises a line which connects the first contact 14 with the second contact 15. There is no inductive coupling. An alternative comprising such an inductive coupling will be described with reference to FIG. 15.

In the following, variants, embodiments and alternatives of the module 11 of FIG. 12 will be described with reference to FIG. 13-FIG. 15. Same reference numerals will be used to designate components having the same function as the components shown in FIG. 12. The term "same function" means that the dimension of the inductances and capacitances is not necessarily the same. Furthermore, the examples of FIG. 12-FIG. 15 comprise three phase lines. However, although unusual, the number of the phase lines may differ.

Figure 13:
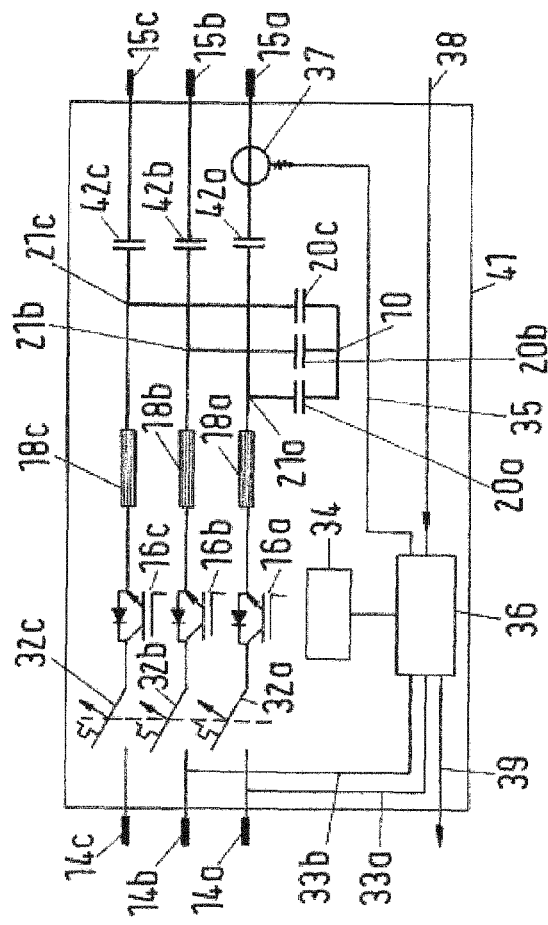

The module 31 shown in FIG. 13 additionally comprises a second switch 32a, 32b, 32c in each line between the first contact 14a, 14b, 14c and the controllable switch 16a, 16b, 16c. The second switch 32 is adapted to interrupt the line in case of an over-current. For example, an earth leakage or ground fault may be the reason for the over-current. The second switches 32 are mechanically or otherwise combined with each other so that the opening of the line performed by one of the switches 32 causes the other switches 32 also to open the respective line.

A low-lever control unit 34 is provided within the module 31 for performing the actions needed to switch the controllable switches 16a, 16b, 16c. In practice, the low-level control unit 34 may be realized by individual gate drive units of the IGBTs or other switching elements. The operation of the low-level control unit 34 is controlled by a higher-level control device 36. In the example shown in FIG. 13-FIG. 15, the control device 36 receives a current signal from a current sensor 37 in one of the lines, wherein the current sensor 37 is connected with the control device 36 via a signal line 35. The control device 36 is adapted to evaluate the current signal and to compare it with a comparison value which corresponds to the expected value of the constant current which is to be produced by the constant current source. Therefore, the current sensor 37 is located at one of the lines between the constant current source and the second contact 15. Alternatively, the current sensor may be located outside of the module 31 within the line of the segment. For example, if the deviation between the expected current value and the value measured by the current sensor differs by more than a predetermined threshold value, the control device 36 controls the low-level control units 34 to open the controllable switches 16.

In addition or alternatively, the control device 36 is connected to a vehicle detection loop 38 for detecting the presence of a vehicle in the vicinity of the associated segment. The control device 36 is adapted to evaluate a corresponding vehicle detection signal received from the vehicle detection loop. Depending on the presence of a vehicle in the vicinity of the associated segment, the control device 36 controls the low-level control unit 34 to close or open the controllable switches 16 so that the associated segment is only operated while a vehicle is in the vicinity of the segment. In particular, in case of the phase lines of the segment being buried in the ground, vicinity means that the vehicle is located or traveling above the segment.

FIG. 13 also shows a further optional feature. Two of the phase lines of the module are connected with the control device 36. The junctions 40a, 40b of these connection lines 33 with the phase lines are located between the first contact 14 and the switches 16 or—if present—the second switches 32. Therefore, the control device 36 can measure the voltage between two of the phase lines of the alternating current supply. This information can be used for the decision whether the controllable switches 16 shall be switched on. For example, if the voltage is too small the control device 36 does not trigger the low-level control unit 34 to switch on the switches 16. One possible reason for the voltage being too small is a line failure (e.g. ground fault) of the lines of the alternating current supply. Another possibility is a failure of the inverter which produces the alternating current flowing through the alternating current supply.

It follows from the above description that some intelligence concerning correct and reliable operation of the associated segment can be integrated in a control device of the switching unit.

The arrangement of FIG. 13 allows powering the control device directly from an alternating current supply without the necessity of an additional power distribution for the control device or control unit.

The control device can be integrated in a common housing and/or attached to a common rack with the switching unit.

More generally speaking, the combination of the controllable switches and the control device can be pre-fabricated and can be installed afterwards on site.

Furthermore, the control device 36 may be connected to a distant central control device via a signal connection 39, for example via a digital data bus, such as a CAN-bus (controller area network bus).

Figure 14:
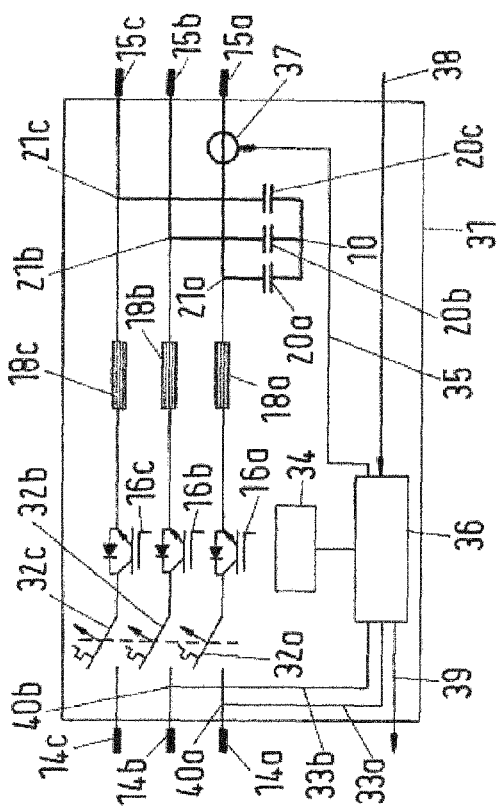

FIG. 14 shows an embodiment comprising an additional capacitance 42a, 42b, 42c. In contrast to the first capacitance 20, the second capacitance 42 is arranged between the junction 21 and the second contact 15 within the phase line. The purpose of the second capacitance 42 is to compensate the inductance of the corresponding line of the associated segment. "Compensation" in this context means tuning the segment to be resonant at a desired alternating current frequency of the supply and avoiding reactive power draw.

Figure 15:
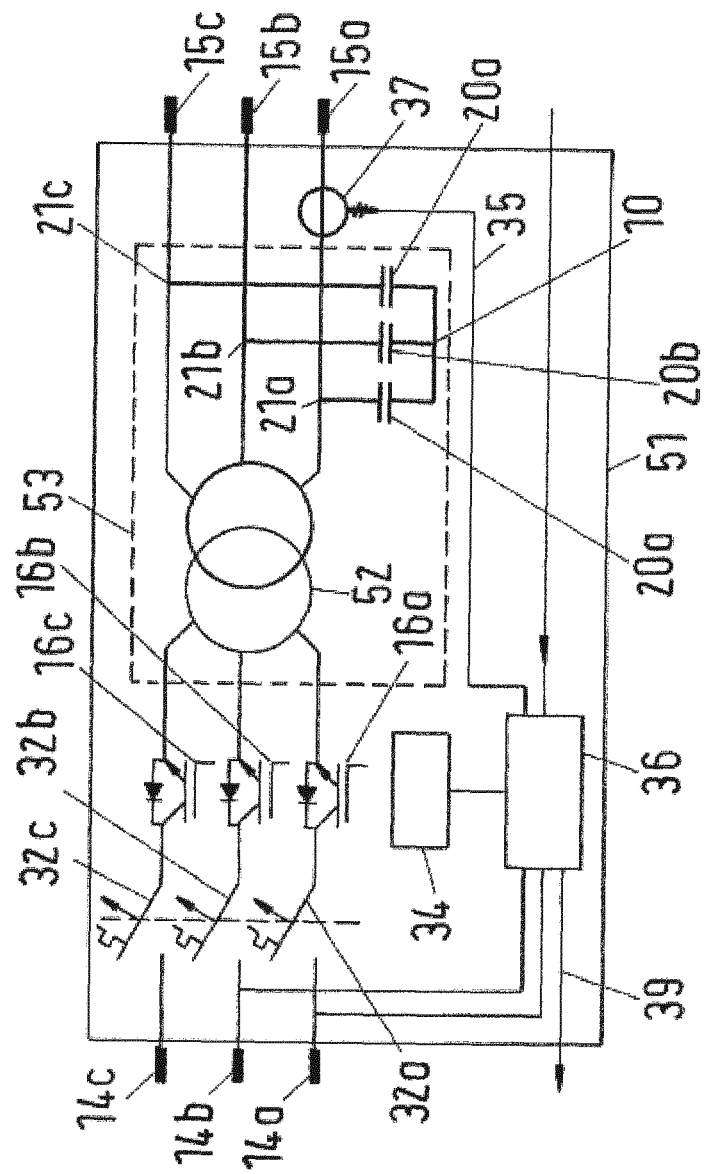

FIG. 15 shows a module 51 comprising a transformer arrangement 52 instead of the inductances 18 of FIG. 13, FIG. 14. Preferably, the transformer arrangement 52 provides a galvanic separation of the primary side and the secondary side. The primary side is the side of the controllable switches 16. Correspondingly, the secondary side is the side of the second contacts 15. The transformer arrangement 52 may be a three-phase transformer or a set of individual transformers for each line. The inductances on the secondary side of the transformer arrangement function in the same manner as the inductances 18 with respect to the production of a constant current through the segment. The module 51 may comprise a pre-fabricated unit 53 comprising the transformer arrangement 52 and the capacitances 20, including the junctions 21 and the star point 10.

In particular, the module 11, 21, 31 or 41 of FIG. 12-FIG. 15 can be cooled by an additional cooling unit, such as a fan. Typically, one cooling device is sufficient for each module. The module can be arranged in the vicinity of the segment. If there are two tracks which extend in parallel to each other and which are defined by the consecutive segments, the module is preferably located in between the tracks and comprises at least one constant current source for each track. For example, the tracks may be tracks for rail vehicles or lanes for road automobiles, such as busses.

The modules of FIG. 12-FIG. 15 can be modified. In particular, the current sensor 37, the control device 36, including the control units 34, and/or the second switches 32 can be omitted. In particular, the components can be dimensioned in the manner as described with reference to FIG. 5-FIG. 11.

As mentioned above, constant current sources for more than one segment of the same track and/or of another track can be integrated in a common module. In particular, such a module can be pre-fabricated and can be installed on side with little effort.

Figure 16:
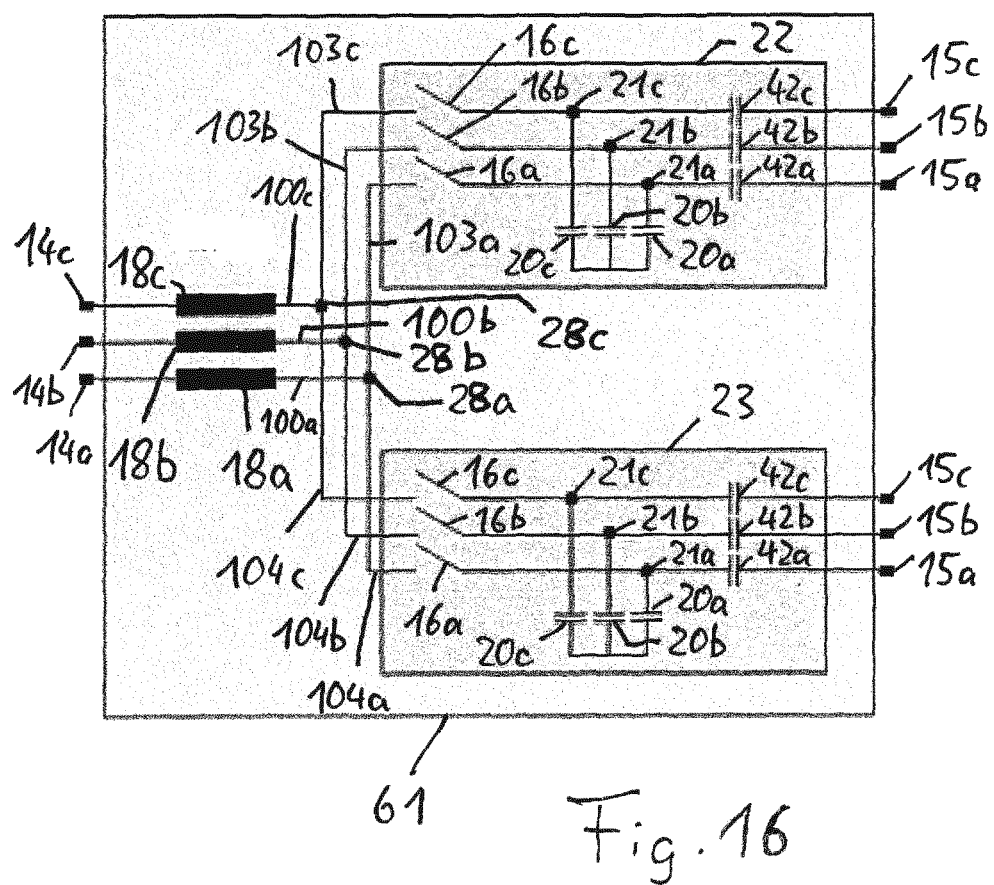

An example of such a common module for two segments is shown in FIG. 16, which shows a modification of the module of FIG. 4. The module 61 comprises two sub-units 22, 23 each of which forms a part of the respective constant current sources of the segments to be connected to the second contacts 15a, 15b, 15c. As mentioned above, same reference numerals in different figures denote identical or functionally corresponding elements.

The sub-units 22, 23 comprise the first capacitances 20 and (optionally) the second capacitances 42a, 42b, 42c of the constant current source. In addition, the sub-units 22, 23 comprise a switch 16a, 16b, 16c in each line 103a, 103b, 103c (unit 22) or 104a, 104b, 104c (unit 23). These switches 16 are used to either operate the first segment (not shown, which is connected to the second contacts 15 of unit 22), to operate the second segment (not shown, which is connected to the second contacts 15 of unit 23) or to operate none of the segments. Therefore, the units can use the same first inductances 18a, 18b, 18c on the input side of the module 61.

The input side comprises first contacts 14a, 14b, 14c for connecting the module to the supply (not shown). These contacts 14 are connected to a junction 28a, 28b, 28c by lines 100a, 100b, 100c and each of these lines 100 comprises a first inductance 18. Each of the junctions 28 connects one of the lines 100 with the respective lines 103a, 104a; 103b, 104b; 103c, 104c of the units 22, 23.

Since the same first inductances 18a, 18b, 18c are used to operate several segments (more than two segments can be operated in the same manner, if there are more than 2 sub-units) the number of components is reduced.

The embodiment of FIG. 16 can be modified. E.g. the first inductance 18 can be constituted by the winding on the secondary side of a transformer, similar to the transformer 52 shown in FIG. 15. In addition or alternatively, the switches 16 of FIG. 16 can be operated by a control unit and a control device similar to the control unit 34 or control device 36 of FIG. 13 to FIG. 15.

The invention claimed is:

1. A system for transferring electric energy to a vehicle, comprising:
    an electric conductor arrangement for producing an alternating electromagnetic field and for thereby transferring electromagnetic energy to the vehicle,
    wherein, the conductor arrangement comprises:
    a plurality of segments electrically connected in parallel to each other and to a current supply, wherein the segments extend in a direction of travel of the vehicle and at least one of the segments is coupled to the current supply via an associated constant current source to keep an alternating electric current through the segment constant,
    wherein, each constant current source comprises at least a first inductance and at least a first capacitance, the inductance and the capacitance being adapted to each other and to a voltage at an input side of the constant current source so that a desired constant current is output to an output side of the constant current source,
    wherein, the first inductance is arranged in a line of the constant current source which connects the input side with the output side and at least one junction of the line is connected with the first capacitance, and
    the first inductance and the first capacitance as well as a second inductance, which is formed at least partly by an inherent inductance of the segment, are adapted to each other and to any additional capacitance in the segment so that the segment can be operated at a corresponding resonance frequency and the reactive power produced by the segment is essentially zero.

2. The system of claim 1, wherein the first inductance and the first capacitance are parts of a common module which is electrically connected to the segment.

3. The system of claim 1, wherein the at least one segment comprises a plurality of electric lines connected to a corresponding line of the constant current source, wherein
    each series connection of a line of the segment and of a line of the constant current source is adapted to carry a different phase of a multi-phase alternating current,
    each line of the constant current source comprises an inductor or an arrangement of inductors forming the first inductance and comprises a capacitor or an arrangement of capacitors forming the first capacitance which is connected to the line via a junction and
    for each of the series connections, the first inductance and the first capacitance as well as a second inductance, which is formed at least partly by the inherent inductance of a corresponding line of the segment, are adapted to each other and to any additional capacitance in the segment so that the segment can be operated at a corresponding resonance frequency and the reactive power produced by the segment is essentially zero.

4. The system of claim 1, wherein the second inductance is completely formed by the inherent inductance of the segment or of a corresponding line of the segment.

5. The system of claim 4, wherein the segment does not comprise an additional capacitance which compensates the inherent inductance(s) of the segment in order avoid a production of reactive power by the segment.

6. The system of claim 1, wherein the constant current source is connected to the current supply via a transformer adapted to produce an input voltage to be input to the constant current source so that the desired constant current is produced by the constant current source.

7. The system of claim 6, wherein the second inductance is completely formed by the inherent inductance of the segment.

8. The system of claim 7, wherein a stray inductance of the transformer acts as the first inductance of the constant current source.

9. A method of manufacturing a system for transferring electric energy to a vehicle, comprising the steps of:
 providing an electric conductor arrangement for producing an alternating electromagnetic field and for thereby transferring electromagnetic energy to the vehicle,
 providing a plurality of segments as part of the conductor arrangement, electrically connected in parallel to each other and to a current supply, so that the segments extend in a direction of travel of the vehicle,
 coupling at least one of the segments to the current supply via an associated constant current source to keep an alternating electric current through the segment constant,
 equipping each constant current source with at least a first inductance and at least a first capacitance, wherein the inductance and the capacitance are adapted to each other and to a voltage at an input side of the constant current source so that a desired constant current is output to an output side of the constant current source,
 placing the first inductance in a line of the constant current source which connects the input side with the output side and connecting at least one junction of the line to the first capacitance, and
 dimensioning the first inductance and the first capacitance as well as a second inductance which is formed at least partly by an inherent inductance of the segment, so that the segment can be operated at a corresponding resonance frequency and the reactive power produced by the segment is essentially zero.

10. The system for transferring electric energy to a vehicle as in claim 1, wherein the vehicle is a track bound vehicle or a road vehicle.

\* \* \* \* \*